(12) United States Patent
Zandi

(10) Patent No.: US 9,680,157 B2
(45) Date of Patent: Jun. 13, 2017

(54) BONDING LAYER INCLUDING PARTICLES HAVING BIMODAL SIZE DISTRIBUTION FOR SOLID OXIDE FUEL-CELLS

(71) Applicant: Saint-Gobain Ceramics & Plastics, Inc., Worcester, MA (US)

(72) Inventor: Morteza Zandi, Shrewsbury, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 261 days.

(21) Appl. No.: 14/502,441

(22) Filed: Sep. 30, 2014

(65) Prior Publication Data

US 2015/0093678 A1    Apr. 2, 2015

Related U.S. Application Data

(60) Provisional application No. 61/884,766, filed on Sep. 30, 2013.

(51) Int. Cl.
| | |
|---|---|
| *H01M 4/86* | (2006.01) |
| *H01M 4/88* | (2006.01) |
| *H01M 8/00* | (2016.01) |
| *H01M 8/24* | (2016.01) |
| *H01M 4/90* | (2006.01) |

(Continued)

(52) U.S. Cl.
CPC ....... *H01M 4/9033* (2013.01); *H01M 4/9066* (2013.01); *H01M 8/006* (2013.01); *H01M 8/0297* (2013.01); *H01M 8/2425* (2013.01); *H01M 8/0232* (2013.01); *H01M 8/0236* (2013.01); *H01M 8/0243* (2013.01); *H01M 2008/1293* (2013.01)

(58) Field of Classification Search
CPC ............. H01M 4/9033; H01M 4/9066; H01M 8/2425; H01M 8/006; H01M 8/0297
USPC .................................................. 429/467, 535
See application file for complete search history.

(56) References Cited

U.S. PATENT DOCUMENTS

| | | |
|---|---|---|
| 4,883,497 A | 11/1989 | Claar et al. |
| 7,736,772 B2 | 6/2010 | Sarkar et al. |

(Continued)

FOREIGN PATENT DOCUMENTS

| | | |
|---|---|---|
| NO | 9728572 A1 | 8/1997 |
| WO | 2010078359 A2 | 7/2010 |

OTHER PUBLICATIONS

International Search Report and Written Opinion for PCT/US2014/058355, dated Jan. 5, 2015, 10 pages.

(Continued)

*Primary Examiner* — Sean P Cullen
(74) *Attorney, Agent, or Firm* — Abel Law Firm Group, LLP; Thomas Osborn

(57) ABSTRACT

A bonding layer used to join individually formed fuel cell units together to create a solid oxide fuel cell stack can include particles contained within a carrier material. The particles can have at least one material component in common with a porous electrode of a first type and a bimodal particle size distribution. In some embodiments, the particles of a first mode of the bimodal particle size distribution are small enough to fit at least partially into the porosity of the electrodes bonded together, while the particles of the second mode of the bimodal particle size distribution are larger than the porosity of the electrodes.

20 Claims, 3 Drawing Sheets

(51) Int. Cl.
*H01M 8/2425* (2016.01)
*H01M 8/0297* (2016.01)
*H01M 8/124* (2016.01)
*H01M 8/0232* (2016.01)
*H01M 8/0236* (2016.01)
*H01M 8/0243* (2016.01)

(56) References Cited

U.S. PATENT DOCUMENTS

| | | |
|---|---|---|
| 7,736,787 B2 | 6/2010 | Day et al. |
| 2003/0012995 A1 | 1/2003 | Hara et al. |
| 2007/0237999 A1 | 10/2007 | Donahue et al. |
| 2009/0075125 A1 | 3/2009 | Gottmann et al. |
| 2010/0047656 A1* | 2/2010 | Li ................... H01M 8/126 429/486 |
| 2010/0062317 A1 | 3/2010 | Selcuk |
| 2010/0203413 A1 | 8/2010 | Agnew et al. |
| 2011/0217616 A1 | 9/2011 | Wu et al. |
| 2013/0137014 A1 | 5/2013 | Lin et al. |

OTHER PUBLICATIONS

Courtney, James Matthew, "Bio-Engineered Gas Diffusion Electrodes (GDEs) for Proton Exchange Membrane Fuel Cells (PEMFCs)," A Thesis submitted to the University of Birmingham for the degree of Master of Research (MRes), The Centre for Hydrogen and Fuel Cell Research, 2011, 107 pages.

Extended European Search Report dated Mar. 24, 2017 with regard to European Patent Application EP 14847602.1.

* cited by examiner

BONDING LAYER INCLUDING PARTICLES HAVING BIMODAL SIZE DISTRIBUTION FOR SOLID OXIDE FUEL-CELLS

CROSS-REFERENCE TO RELATED APPLICATION

This Application claims priority under 35 U.S.C. §119(e) to U.S. Provisional Application No. 61/884,766 entitled "Bonding Layer for Solid Oxide Fuel Cells," by Morteza Zandi, filed on Sep. 30, 2013. The above-referenced application is assigned to the current assignee hereof and is incorporated herein by reference in its entirety.

FIELD OF THE DISCLOSURE

This disclosure, in general, relates to solid oxide fuel cells or other multilayer porous ceramic devices and, in particular, to a bonding layer to join fuel cell stacks together.

BACKGROUND

A solid oxide fuel cell (SOFC) is a device that generates electricity by a chemical reaction. FIG. 1 shows a conventional SOFC cell 10 including a cathode layer 102, an anode layer 106, and an electrolyte layer 104. Fuel cells are typically characterized by their electrolyte material, with SOFCs having a solid oxide or ceramic electrolyte.

During operation of the SOFC, an oxidant, usually air, is fed through a plurality of air channels 120 defined by the cathode 102, while fuel, such as hydrogen gas ($H_2$), is fed through a plurality of fuel channels 121 defined by the anode 106. The oxidant and fuel channels can be oriented at right angles to one another. The anode and cathode layers are separated by an electrolyte layer 104. During operation, the oxidant is reduced to oxygen ions at the cathode. These oxygen ions can then diffuse through the solid oxide electrolyte to the anode where they can electrochemically oxidize the fuel. In this reaction, a water byproduct is given off as well as two electrons. These electrons are transported through the anode to an external circuit (not shown) and then back to the cathode, providing a source of electrical energy in the external circuit. The flow of electrons in the external circuit typically provides an electrical potential of approximately 1.1 volts.

To generate larger voltages, a larger number of individual cells (each cell consisting of an anode and a cathode separated by an electrolyte layer) are combined in series so that the electricity each cell generates can be combined. During the manufacturing process, it is often desirable to combine a plurality of cells into a larger unit, referred to herein as a "cell unit" for convenience. FIG. 2 illustrates an exemplary embodiment of a solid oxide fuel cell unit 20. The cell unit 20 of FIG. 2 includes six separate cells (231, 232, 233, 234, 235, and 236) as shown in FIG. 1. As in the cell shown in FIG. 1, each of the individual cells combined to form the cell unit 20 of FIG. 2 includes a cathode layer 202 (having air channels 220) and an anode layer 206 (with fuel channels 221) separated by an electrolyte layer 204. Individual cells are combined using interconnect layers 208. These individually fabricated units having a particular power output can then be combined together to create a fuel cell stack with virtually any desired total power output. The desired number of individual cell units are stacked on top of each other and bonded together to create the final solid oxide fuel cell stack.

The bonding material used to connect the individual cell units should be electrically connective, gas permeable, mechanically strong, and thermally stable throughout the temperature ranges to which the fuel cell stack will be subjected. Due to the demanding operating conditions for a solid oxide fuel cell stack, an ideal bonding material that satisfies these requirements has proven elusive.

Therefore, there is a need for an improved bonding layer used to join individually formed cell units together to create a solid oxide fuel cell stack.

BRIEF DESCRIPTION OF THE DRAWINGS

The present disclosure may be better understood, and its numerous features and advantages made apparent to those skilled in the art by referencing the accompanying drawings.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

The present disclosure can be used in a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel that is used to heat the home, such as natural gas. The SOFC system can run for extended periods of time to generate electricity to power the home and if excess amounts are generated, the excess can be sold to the electric grid. Also, the heat generated in the SOFC system is of high quality and therefore can be used to provide hot water for the home. SOFCs can be particularly useful in areas where electric service is unreliable or non-existent.

Figure 1:
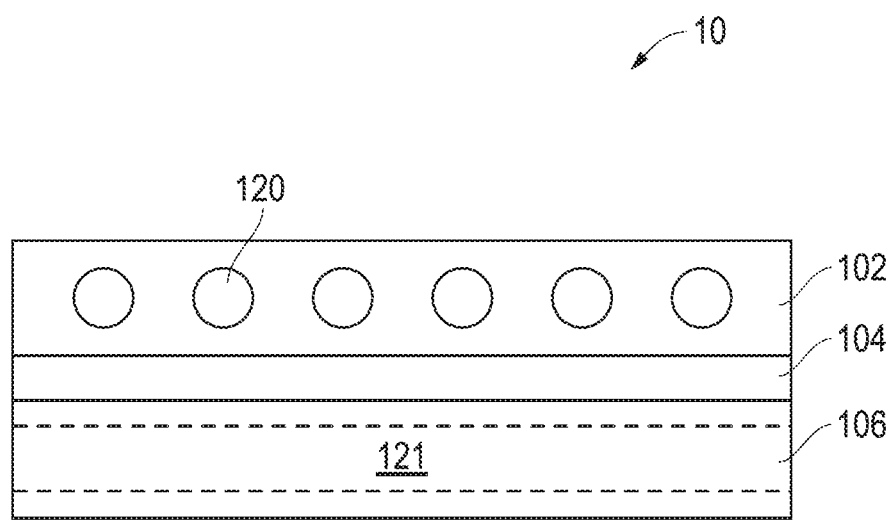
FIG. 1 shows a single cell in a solid oxide fuel cell.

For a solid oxide fuel cell to function, a dense electrolyte layer must separate two porous electrodes. The electrodes are electronic conductors, and are necessary to collect direct current from the cell. In the particular embodiment of FIG. 1, electrode 102 is a cathode and electrode 106 is an anode. The arrangement of one anode 106 and one cathode 102 separated by an electrolyte 104 will be referred to herein as a cell.

Figure 2:
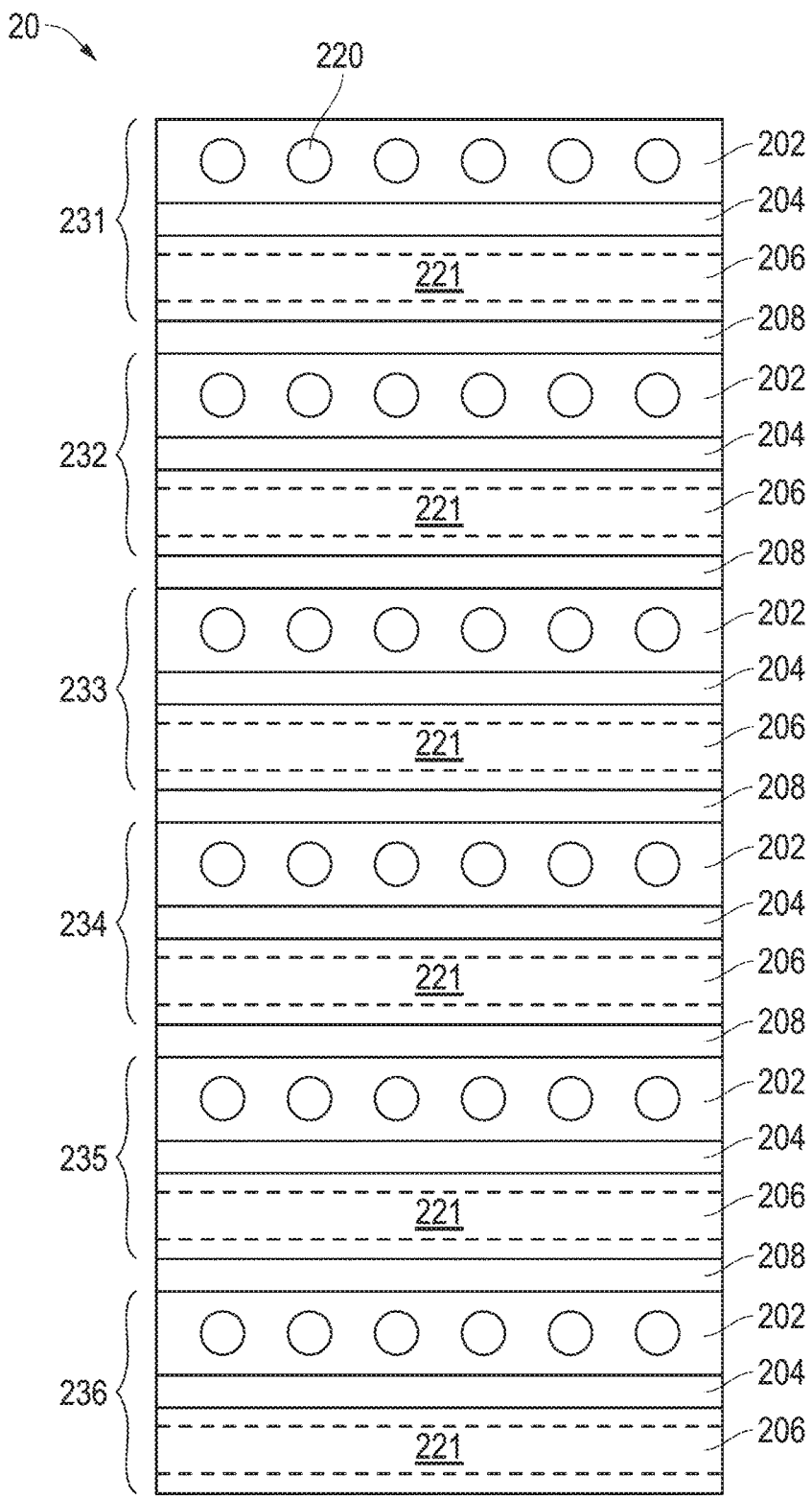
FIG. 2 illustrates an exemplary embodiment of a solid oxide fuel cell unit.

During the manufacturing process, described below, it is often desirable to combine a plurality of cells into a larger unit, referred to herein as a "cell unit" for convenience. Cells are stacked on top of each other and connected via electrical interconnect layers to form an individually manufactured cell unit having a certain power output. The electrically conductive interconnect layers are formed between the anode layers and the cathode layers of each pair of adjacent cells to connect the cells in series so that the electricity each generates can be combined. FIG. 2 illustrates an exemplary embodiment of a solid oxide fuel cell unit having six individual cathode-anode cells (231-236), each having a cathode layer 202 (with air channels 220) and an anode layer 206 (with fuel channels 221) separated by an electrolyte layer 204. In the particular embodiment, interconnect layers 208 connects the anode 206 of one cell to the cathode 202 of the adjacent cell 224.

These individually fabricated units having a particular power output can then be combined together to create a fuel cell stack with virtually any desired total power output. The desired number of individual cell units are stacked on top of each other and bonded together to create the final solid oxide fuel cell stack.

The cell unit in FIG. 2 is shown with six cells. In reality, a fuel cell stack can have the number of cell units suitable for the particular task of the stack, and each cell unit can have the number of cells suitable for the task. The typical fuel cell formed as described herein will have a large number of cell units, each with a plurality of cells.

Each porous electrode layer may also include channels 220, 221. Depending upon the type of electrode, an oxidizer gas or fuel gas flows through channels and ions are transported across the electrolyte layers. Although more complex gases, such as natural gas/propane and air, respectively, can and in many cases are supplied to the cell, the basic requirements are only hydrogen and oxygen.

Referring to FIG. 2, in operation of a solid oxide fuel cell, the separation of the oxidizer gas in anode 206 and fuel gas in cathode 202 by the electrolyte 204 creates an oxygen partial pressure gradient. This gradient causes oxygen ions to be transported across the electrolyte 204 and to react with the fuel. The pattern may be repeated multiple times to form a stack with a large number of individual cell units and cells.

Adjacent stacked cells must be bonded together and electrically connected in series so that the electricity each cell generates can be combined. Increasing the number of cells increases the Z-axis size of a stack. The X and Y axes of a stack can be increased independently of the Z-axis.

In some circumstances, it may be desirable to have one more of one type of electrode than the other. For example, it is sometimes desirable to have the two exposed end layers of the stack be cathode layers because the cathode layers are stable in air, while the anode layers will oxidize if exposed to air. Such an arrangement is shown in the cell unit of FIG. 2. It is also sometimes advantageous for to have the same type of electrode layer on the top and bottom of a stack so that there will be symmetry during the manufacturing process. As used herein, the terms "top" and "bottom" are merely for convenience as the stack can be oriented in any direction. The terms "outer electrode layer" or "outermost electrode layer" or similar will be used herein to refer to the first and last electrode layers in a stack (the top and bottom electrode layers in the orientation of FIGS. 1 and 2).

Accordingly, in other embodiments, such as the stack shown in FIG. 2, there can be one more cathode layer than there are anode layers. As a result, both the top electrode layer (in the orientation of FIG. 2) and the bottom electrode layer will be cathode layers. In other embodiments, the reverse can also be true, with one more anode layer than there are cathode layers so that the top and bottom electrodes are both anode layers. FIG. 2 shows an embodiment with thirteen total electrode layers. Separating each adjacent pair of the electrode layers is either an electrolyte 204 or an interconnect 208.

Figure 3:
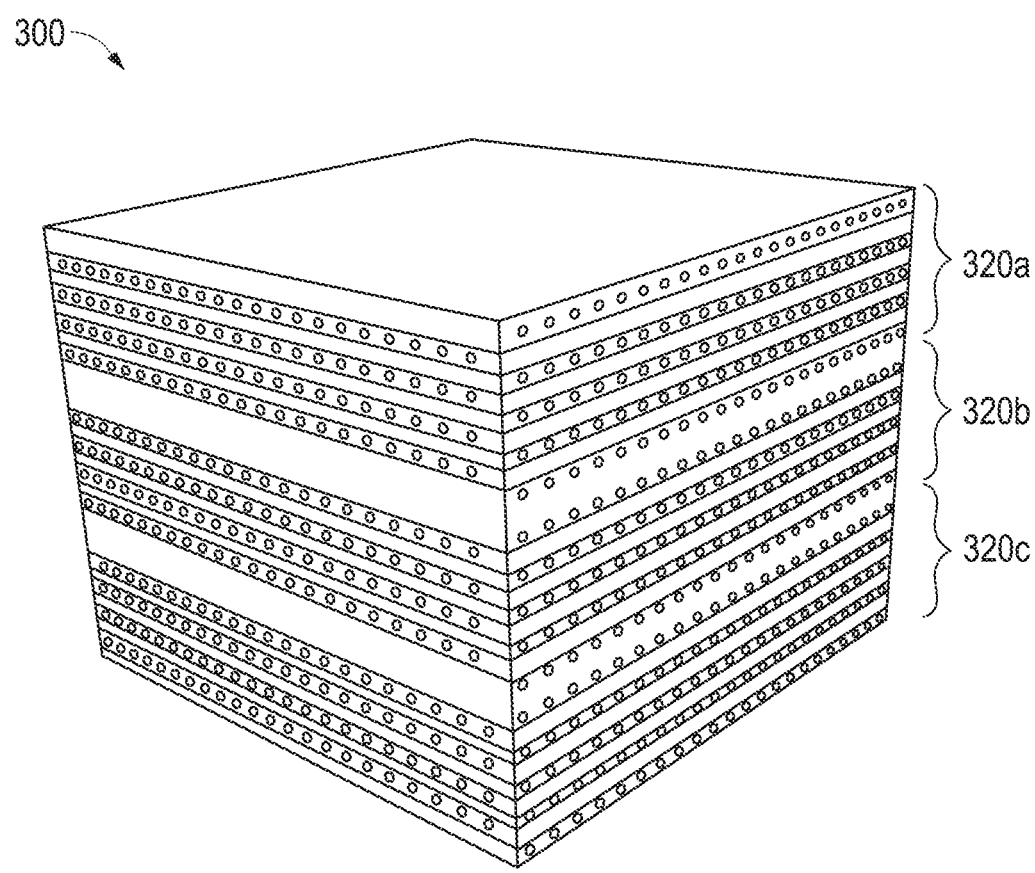
FIG. 3 shows a solid oxide fuel cell stack resulting from the combination of three solid oxide fuel cell units.

In order to create a final solid oxide fuel cell stack having a desired power output, an appropriate number of individually fabricated cell units with a particular power output are combined together. In a very simple example, if the fabricated cell units each produced a power output of 20 watts, and if the desired power output for the final solid oxide fuel cell stack is 60 watts, then three of the individually fabricated cell units would need to be combined to produce the desired power output. FIG. 3 shows a bonded solid oxide fuel cell stack 300 resulting from such a combination of three cell units (320a, 320b, 320c) as shown in FIG. 2.

As discussed in detail below, the bonding layer used to bond the cell units together will preferably be electrically connective, gas permeable, mechanically strong, and thermally stable throughout the temperature ranges to which the fuel cell stack will be subjected. "Bonding layer," as the term is used herein, refers to a material layer used to connect two of the same type of electrode layers together. In other words, a bonding layer according to particular embodiments described herein connects an outer cathode layer from one cell unit to an outer cathode layer of another cell unit (cathode-to-cathode). Alternatively, a bonding layer can connect anode layers from adjacent cell units (anode-to-anode). Thus, a bonding layer can be distinguished from an "interconnect layer," which as used herein will refer to a layer connecting different types of electrode layers from adjacent cells (cathode-to-anode).

Materials for the cathode can include lanthanum manganite materials. The cathode can be made of a doped lanthanum manganite material, giving the cathode composition a perovskite type crystal structure. Accordingly, the doped lanthanum manganite material has a general composition represented by the formula, $(La_{1-x}A_x)_yMnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr. According to a particular embodiment, the dopant is Sr, and the cathode layer may include a lanthanum strontium manganate material, known generally as LSM.

According to one embodiment, the doped lanthanum manganite cathode material comprises $(La_{1-x}A_x)_yMnO_{3-\delta}$, wherein x is not greater than about 0.5, y is not greater than about 1.0, and the ratio of La/Mn is not greater than about 1.0. The value of x within the doped lanthanum manganite composition represents the amount of dopant substituted for La within the structure. According to one embodiment, x is not greater than about 0.5, such as not greater than about 0.4 or 0.3. Still, the amount of dopant provided within the cathode material may be less, such that x is not greater than about 0.2, or still 0.1, and particularly within a range of between about 0.4 and 0.05.

Alternatively, or additionally, the material of the cathode can include a La-ferrite based material. Typically, the La-ferrite based material can be doped with one or more suitable dopants, such as Sr, Ca, Ba, Mg, Ni, Co or Fe. Examples of doped La-ferrite based materials include LaSrCo-ferrite (LSCF) (e.g., $La_{1-g}Sr_qCo_{1-j}Fe_jO_3$) where each of q and j independently is equal to or greater than 0.1, and equal to or less than 0.4 and (La+Sr)/(Fe+Co) is in a range of between about 1.0 and about 0.90 (molar ratio). In one specific embodiment, the cathode can include a mixture of a La-manganite and La-ferrite material. For example, the cathode can include a LaSr-manganite (LSM) (e.g., $La_{1-k}Sr_kMnO_3$) and a LaSrCo-ferrite (LSCF). Common examples include $(La_{0.8}Sr_{0.2})_{0.98}Mn_{3+\Delta}$ ($\Delta$ is equal to or greater than zero, and equal to or less than 0.3) and $La_{0.6}Sr_{0.4}Co_{42}Fe_{0.8}O_3$.

The cathode layer may be a porous layer, having porosity within a range between about 25 vol % and about 60 vol %, for the total volume of the cathode layer.

In contrast, the anode layer may include a cermet material, that is, a combination of a ceramic and metallic material. Some suitable metals can include transition metal species, including for example, nickel or copper. The anode can include an ionic conductor, including for example, a ceramic material, and particularly, an oxide material. For example, the anode may be formed with nickel and a zirconia-based material, including for example, yttria-stabilized zirconia. Alternatively, the anode can include a ceria-based material, including for example, gadolinium oxide-stabilized ceria. The nickel can be produced through the reduction of nickel oxide included in the anode green material. Alternatively, it will be appreciated that certain other types of oxide materials may be used in the anode layer, such as titanates, manganites, chromites, a combination thereof, and the like. It will be appreciated, that such oxides may also be perovskite materials. The anode layer can also be a porous layer, having porosity within a range between about 25 vol % and about 60 vol %, for the total volume of the anode layer.

The actual composition of a preferred bonding layer will thus depend on whether the bonding layer is being used to form a cathode-to-cathode bond or an anode-to-anode bond, and further upon the actual composition of the anode or cathode layers. As discussed above, a preferred bonding material should be mechanically strong. There is a direct correlation between bonding strength and mechanical failure in SOFCs. A bonding layer, applied as described herein, should produce a bond that is sufficiently strong to resist fracture or delamination (separating from the electrode layers being bonded). A preferred bonding layer will be able to withstand a load (measured by a pull strength test) of at least 8 MPa. In a particular embodiment, the bonding layer will be strong enough that the electrode material fails before the bond material fractures or delaminates from the electrode.

A bonding layer should also have a coefficient of thermal expansion (CTE) that matches the CTE of the adjacent electrode layers. As used herein, the term "adjacent electrode," when used with respect to the bonding layer, will refer to an outer electrode in a cell unit that is bonded to the bonding layer in order to connect that cell unit to another cell unit.

The bonding layer material must be able to survive extended service at elevated temperatures and repeated thermal cycles. Undesirable thermal stress and cracking may result from a CTE mismatch between the bonding layer and the electrode layers in direct contact with the bonding layer. If the bonding material expands at a rate that is different than the thermal expansion rate of the bonded electrodes, the bonding material may either crack or cause cracking of the electrodes. As a result, the thermal expansion coefficients (CTE) of a bonding material and the electrode material are kept as close as possible to avoid thermal stresses between bonding layer and the electrode during the SOFC operation. Preferably, the bonding layer has a CTE that is within about ±5 ppm/° C., about ±2 ppm/° C., about ±1 ppm/° C., or less than about 1 ppm/° C. of the CTE of the electrode layers.

A bonding layer should also have sufficient porosity to allow gas flow between the two electrode layers. This allows two adjoining electrodes separated by a bonding layer to share a gas source, which helps to maintain a compact stack size. Also, depending on the materials in the electrode it may be desirable to ensure a particular partial pressure of oxygen on both sides of the bond region to prevent deterioration of the electrode materials. This is easier to accomplish with a sufficiently porous bonding layer.

And finally, the bonding layer should be electrically conductive so that the electricity each cell unit generates can be combined. Preferably, the bonding layers will not increase the overall electrical resistance for the fuel cell stack. A preferred bonding layer should also have sufficient electronic conductivity to largely match the conductivity of the electrode layer. In a particular embodiment, the conductivity of the bonding layer should be greater than about 5 S/cm at operation temperatures.

A preferred bonding layer will have at least one material component common to the adjacent electrode layers. For example, where the outer electrode layers are cathode layers comprising lanthanum strontium manganite (LSM), a preferred bonding layer could also comprise LSM. Where the outer electrode layers are anode layers comprising a cermet material, a preferred bonding layer could comprise nickel-YSZ. Alternatively, a preferred bonding layer could comprise lanthanum titanate, lanthanum chromite, strontium titanate, and/or lanthanum strontium titanate depending upon the composition of the anode layers Preferably, the boding layer includes particles—for example, LSM particles where the bonding layer is formed between two LSM cathode layers—having a bimodal size distribution. A first mode of the bimodal particle size distribution could have a $d_{50}$ of less than 6.3 micrometers, at least about 6.3 micrometers, at least about 6.9 micrometers, at least about 7.5 micrometers, or at least about 8.1 micrometers, or a $d_{50}$ of no greater than about 10.3 micrometers, no greater than about 9.6 micrometers, no greater than about 9.2 micrometers, no greater than about 8.5 micrometers, no greater than about 7.5 micrometers, or no greater than about 6.5 micrometers. In some embodiments, the first mode of the bimodal particle size distribution can have a $d_{50}$ within a range of about 6 to about 10 micrometers or of about 8.2 micrometers to about 8.9 micrometers.

A second mode of the bimodal particle size distribution could have a $d_{50}$ of at least about 15.9 micrometers, at least about 19.3 micrometers, at least about 24.8 micrometers, or at least about 32.6 micrometers; or no greater than about 50.8 micrometers, no greater than about 43.2 micrometers, no greater than about 46.7 micrometers, no greater than about 38.1 micrometers, no greater than about 25 micrometers no greater than about 20 micrometers, or no greater than about 15 micrometers. In some embodiments, particles of the second mode of the bimodal particle size distribution can have a $d_{50}$ within a range of about 21.8 micrometers to about 27.4 micrometers.

Applicants have discovered that the second or larger sized particles in the bimodal size distribution help modify the shrinkage characteristics of the bond material, while the first or smaller sized particles will greatly strengthen the mechanical bond if the first particles are small enough to at least partially fit into the porosity of the electrode material. Thus, if the electrodes use a finer particle size (resulting in finer porosity) it will be desirable in some embodiments to use even finer sized particles as the smaller sized particle in the bimodal distribution of the bond material.

In some embodiments, the bonding material comprises at least about 38 wt % of the particles of the first mode of the bimodal particle size distribution for a total weight of the particles (such as LSM particles), at least about 43 wt % of the particles of the first mode of the bimodal particle size distribution of a total weight of the particles, or at least about 48 wt % particles of the first mode of the bimodal particle size distribution for a total weight of the particles. The bonding material can comprise no greater than about 61 wt % of the particles of the first mode of the bimodal particle size distribution for a total weight of the particles, no greater than about 57 wt % of the particles of the first mode of the bimodal particle size distribution of a total weight of the particles, no greater than about 53 wt % particles of the first mode of the bimodal particle size distribution for a total weight of the particles; or no greater than about 50 wt % particles of the first mode of the bimodal particle size distribution for a total weight of the particles.

In some embodiments, the bonding material comprises at least about 37 wt % particles of the second mode of the bimodal particle size distribution for a total weight of the particles, at least about 44 wt % of the particles of the second mode of the bimodal particle size distribution of a total weight of the particles, or at least about 47 wt % particles of the second mode of the bimodal particle size distribution for a total weight of the particles. The bonding material can also comprise no greater than about 59 wt % of the particles of the first mode of the bimodal particle size distribution for a total weight of the particles, no greater than about 55 wt % of the particles of the first mode of the bimodal particle size distribution of a total weight of the particles, or no greater than about 50 wt % particles of the first mode of the bimodal particle size distribution for a total weight of the particles.

The bonding material can also include a content of particles of the first mode of the bimodal particle size distribution that is substantially equal to a content of particles of the second mode of the bimodal particle size distribution. In some embodiments, the bonding layer can comprise a single layer coupled between a first solid oxide fuel cell unit and a second solid oxide fuel cell unit. The single layer can have a thickness of at least about 81 micrometers, at least about 113 micrometers, at least about 148 micrometers, at least about 174 micrometers, or at least about 202 micrometers; wherein the thickness of the single layer is no greater than about 305 micrometers, no greater than about 279 micrometers, no greater than about 256 micrometers, or no greater than about 229 micrometers. In some embodiments, the thickness of the single layer is within a range of about 220 micrometers to about 280 micrometers.

Preferably, the bonding material includes a porosity of at least about 33 vol % of a total volume of the bonding material, at least about 37 vol % of a total volume of the bonding material, at least about 40 vol % of a total volume of the bonding material, a porosity of no greater than about 51 vol % of a total volume of the bonding material, no greater than about 48 vol % of a total volume of the bonding material, or no greater than about 44 vol % of a total volume of the bonding material. In some embodiments, the bonding material includes a porosity within a range of about 36 vol % of a total volume of the bonding material to about 48 vol % of a total volume of the bonding material.

The process of joining ceramic bodies (such as the adjacent electrodes for stacked cell units) preferably includes depositing the bonding material onto the ceramic surfaces to be bonded, assembling the ceramic bodies into a stack, and sintering the assembled stack. Printable ink containing particles of the bonding material is used as a carrier for depositing the bonding layer. In a particular embodiment, the printable ink comprises particles of the bonding material mixed in a liquid carrier such as a liquid organic vehicle. The organic vehicle can include any combination of the following (with the composition expressed in wt % of the organic liquid): 5-25 wt % 2-(2-butoxyethoxy) ethyl acetate, 10-80 wt % terpineol (mixed isomers), 0-1 wt % polymeric suspension, and 15-25 wt % acrylic resin. The printable ink can be mixed and de-aired by vacuuming prior to use.

In some embodiments, the ink includes at least about 64 wt % bonding material particles (such as LSM), at least about 69 wt % particles of a total weight of the ink, at least about 73 wt % particles of a total weight of the ink, or at least about 76 wt % particles of a total weight of the ink, no greater than about 88 wt % particles of a total weight of the ink, no greater than about 83 wt % particles of a total weight of the ink, or no greater than about 80 wt % particles of a total weight of the ink. In a specific example, the ink can include particles within a range of about 83 wt % of a total weight of the ink to about 77 wt % of a total weight of the ink.

The viscosity of the printable ink containing the bonding material is preferably from about 80 to 160 kilocentipoise (Kcps), such as within a range of about 90 Kcps to about 150 Kcps. In some embodiments, the viscosity of the ink is at least about 56 Kcps, at least about 80 Kcps, at least about 112 Kcps, at least about 131 Kcps, the viscosity of the ink is no greater than about 196 Kcps, no greater than about 175 Kcps, no greater than about 160 Kcps, or no greater than about 139 Kcps.

The bonding material ink can be transported to the bond area by a variety of methods, including screen printing, spray coating, slip casting, or vacuum slip casting. Applicants have discovered, however, that using stencil printing provides unexpected advantages over other known transport methods. Stencil printing allows a thick ink layer to be deposited in one pass, whereas other known methods require multiple passes. Bonding material transported using stencil printing of the ink mixture also unexpectedly results in a bonding layer that is stronger and has fewer defects. Applicants believe that application of a number of thinner ink coats using a method such as screen printing results in the ink being absorbed into the porous electrode surfaces and drying too quickly. As a result, the bonding layers are too thin and the bond itself is weaker because the ink dried too much before the bonded cell units could be assembled. When the bonding material dries out too much, the coated surfaces will not stick together. The much thicker layers applied by stencil printing are not absorbed as well by the electrode porosity and do not dry out as quickly.

Applicants have discovered that the bond will be stronger when the drying rate of the bonding ink is controlled so that the ink is still sufficiently wet when the SOFC cell units are bonded. The drying rate of the bonding ink can be controlled, for example, by assembling the fuel cell stack inside a chamber with a controlled atmosphere having a high enough vapor pressure that the ink will not dry too quickly or by adding other agents to the ink to help maintain fluidity.

In a particular embodiment, a plurality of SOFC cell units can be placed in a printing fixture that holds the cell units in place. A stencil with openings of a desired size can be placed on the cell units. The stencil can be fabricated, for example, from a MYLAR sheet. The stencil openings can then be filled with the bonding material ink, for example by using a straight edge. After the stencil is removed, the cell units are placed in a bonding fixture with the printed sides facing each other. The cell units can then be aligned, pressed together under pressure (for example, under a pressure of 1-2 psi) and dried (for example, at room temperature for 1-2 hours). This serves to partially bond the cell units so that the adjacent cell units will be less likely to slip during the sintering process.

The bonded cell units are then placed in a furnace and fired to further strengthen the bond. For example, the partially bonded cell units can be heated within a range of approximately 1050° C. to approximately 1350° C. for two hours (without any applied pressure). Preferably, a slow heating rate is used to burn off and remove the organic vehicle. The cell units can then be heated for of about 1 hour to about 3 hours within a range of approximately 1250° C. to approximately 1350° C. at a load (pressure) of about 0.1 MPa. Put another way, in particular embodiments, sintering the solid oxide fuel cell stack under an applied load takes place at a pressure within a range of approximately 1 psi to approximately 500 psi, or approximately 100 psi to approximately 150 psi. Sintering the bonding material under a load in this fashion fully bonds the cell units together and results in a bond strength that is significantly higher than if the cell units were only free sintered (without pressure).

In general, the use of finer particles in the bonding material will allow sintering steps to be performed at lower temperatures, which will reduce the effects of temperature on the rest of the fuel cell stack. In particular embodiments, the composition of the bond material can be selected or altered to reduce the sintering temperatures.

Fuel cell units for use with embodiments of the inventive concepts described herein can be made by any suitable method known in the art. As discussed above, any suitable anode and cathode materials known in the art can be used in the invention.

Any suitable electrolyte material known in the art also can be used for the electrolyte of the invention. Preferably, electrolyte is a solid electrolyte. Specific examples include $ZrO_2$ based materials, such as $Sc_2O_3$-doped $ZrO_2$, $Y_2O_3$-doped $ZrO_2$, $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$, and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.5}O_3$, $La_{0.9}Sr_{0.1}Ga_{0.8}Mg_{0.2}O_3$, $LaSrGaO_4$, $LaSrGa_3O_7$ or $La_{0.9}A_{0.1}GaO_3$ where A=Sr, Ca or Ba); and mixtures thereof. Other examples include doped yttrium-zirconate (e.g., $Y_2Zr_2O_7$), doped gadolinium-titanate (e.g., $Gd_2Ti_2O_7$) and brownmillerites (e.g., $Ba_2In_2O_6$ or $Ba_2In_2O_5$).

The interconnect layer can include a ceramic material, including an inorganic material. In particular, the interconnect layer can include an oxide material, and more particularly, can be a chromite or titanate material. More particularly, the interconnect layer can include an element selected from the group consisting of lanthanum (La), manganese (Mn), strontium (Sr), titanium (Ti), niobium (Nb), calcium (Ca), gallium (Ga), cobalt (Co), yttria (Y), and a combination thereof. In certain instances, the interconnect layer 208, 216 can include a chromium oxide-based materials, nickel oxide-based materials, cobalt oxide-based materials, and titanium oxide-based materials (e.g., lanthanium strontium titanate). In particular, the interconnect layer 208 can be made of a material, such as $LaSrCrO_3$, $LaMnCrO_3$, $LaCaCrO_3$, $YCrO_3$, $LaCrO_3$, $LaCoO_3$, $CaCrO_3$, $CaCoO_3$, $LaNiO_3$, $LaCrO_3$, $CaNiO_3$, $CaCrO_3$, and a combination thereof. In particular, the interconnect layer 208 can comprise LST (or YST), and may consist essentially of Nb doped LST, such as $La_{0.2}Sr_{0.8}TiO_3$, having one or more dopants. It will be appreciated, that the interconnect material may include an A-site deficient material, wherein for example, the lattice sites typically occupied by lanthanum or strontium cations are vacant, and thus the material has a non-stoichiometric composition.

In order to form a solid oxide fuel cell unit as shown in FIG. 2, each of the layers can be formed individually before assembling the layers in the stack. That is, the layers can be formed separately as green layers and assembled together into the cell unit stack. Alternatively, the layers may be formed in green state in succession on each other, such that a first green electrolyte layer is formed, and thereafter, a green electrode layer can be formed overlying the green electrolyte layer, and thereafter, a green interconnect layer can be formed overlying the green electrode layer. The method further including sintering the green SOFC cell unit in a single sintering process to form a sintered SOFC cell unit.

Reference herein to "green" articles is reference to materials that have not undergone sintering to affect densification or grain growth. A green article is an unfinished article that may be dried and have low water content, but is unfired. A green article can have suitable strength to support itself and other green layers formed thereon.

The layers described according to the embodiments herein can be formed through techniques including, but not limited to, casting, deposition, printing, extruding, lamination, die-pressing, gel casting, spray coating, screen printing, roll compaction, injection molding, and a combination thereof. In one particular instance, each of the layers can be formed via screen printing. In another embodiment, each of the layers can be formed via a tape casting process.

Item 1. A solid oxide fuel cell stack, comprising:
   at least two fuel cell units, each fuel cell unit comprising at least one porous electrode layer of a first type and at least one porous electrode layer of a second type separated by an electrolyte layer; and
   a bonding layer coupled between two fuel cell units and bonding the outer surface of an electrode of the first type in one fuel cell unit to the outer surface of an electrode of the first type in another fuel cell unit;
   wherein the bonding layer comprises particles contained within a carrier material, the particles having at least one material component in common with the porous electrode of a first type and wherein the particles have a bimodal particle size distribution in which particles of a first mode of the bimodal particle size distribution are small enough to fit at least partially into the porosity of the electrode of a first type and in which particles of a second mode of the bimodal particle size distribution are larger than the porosity of the electrode of a first type.

Item 2. A solid oxide fuel cell stack comprising:
   a first solid oxide fuel cell unit;
   a second solid oxide fuel cell unit; and
   a bonding layer coupled between an outer porous electrode layer of the first solid oxide fuel cell unit and an outer porous electrode layer of the second solid oxide fuel cell unit, the outer porous electrode layers of the first and second solid oxide fuel cell units having the same composition;
   wherein the bonding layer includes a bonding material comprising particles having at least one material component in common with the composition of the outer porous electrode layers of the first and second solid oxide fuel cell units and wherein the particles have a bimodal particle size distribution.

Item 3. The solid oxide fuel cell stack of any one of the preceding items, wherein a thickness of the bonding layer is at least about 40 micrometers, at least about 81 micrometers, at least about 113 micrometers, at least about 148 micrometers, at least about 174 micrometers, or at least about 202 micrometers; wherein the thickness of the bonding layer is no greater than about 305 micrometers, no greater than about 279 micrometers, no greater than about 256 micrometers, or no greater than about 229 micrometers.

Item 4. The solid oxide fuel cell stack of any one of the preceding items, wherein a thickness of the bonding layer is within a range of about 220 micrometers to about 280 micrometers.

Item 5. The solid oxide fuel cell stack of any one of the preceding items, wherein the bonding material includes a porosity of at least about 33 vol % of a total volume of the bonding material, at least about 37 vol % of a total volume of the bonding material, or at least about 40 vol % of a total volume of the bonding material; or wherein the bonding material includes a porosity of no greater than about 51 vol % of a total volume of the bonding material, no greater than about 48 vol % of a total volume of the bonding material, or no greater than about 44 vol % of a total volume of the bonding material.

Item 6. The solid oxide fuel cell stack of any one of the preceding items, wherein the bonding material includes a porosity within a range of about 36 vol % of a total volume of the bonding material to about 48 vol % of a total volume of the bonding material Item 7. The solid oxide fuel cell stack of any one of the preceding items, wherein particles of a first mode of the bimodal particle size distribution have a d50 of at least about 6.3 micrometers, at least about 6.9 micrometers, at least about 7.5 micrometers, or at least about 8.1 micrometers; or wherein the first mode of the bimodal particle size distribution has a d50 of no greater than about 10.3 micrometers, no greater than about 9.6 micrometers, no greater than about 9.2 micrometers, or no greater than about 8.5 micrometers.

Item 8. The solid oxide fuel cell stack of any one of the preceding items, wherein particles of the first mode of the bimodal particle size distribution have a d50 within a range of about 8.2 micrometers to about 8.9 micrometers.

Item 9. The solid oxide fuel cell stack of any one of the preceding items, wherein particles of the second mode of the bidmodal particle size distribution have a d50 of at least about 15.9 micrometers, at least about 19.3 micrometers, at least about 24.8 micrometers, or at least about 32.6 micrometers; or no greater than about 50.8 micrometers, no greater than about 43.2 micrometers, no greater than about 46.7 micrometers, or no greater than about 38.1 micrometers.

Item 10. The solid oxide fuel cell stack of any one of the preceding items, wherein particles of the second mode of the bimodal particle size distribution have a d50 within a range of about 21.8 micrometers to about 27.4 micrometers.

Item 11. The solid oxide fuel cell stack of any one of the preceding items, wherein the bonding material comprises at least about 38 wt % of the particles of the first mode of the bimodal particle size distribution for a total weight of the particles, at least about 43 wt % of the particles of the first mode of the bimodal particle size distribution of a total weight of the particles, or at least about 48 wt % particles of the first mode of the bimodal particle size distribution for a total weight of the particles; or wherein the bonding material comprises no greater than about 61 wt % of the particles of the first mode of the bimodal particle size distribution for a total weight of the particles, no greater than about 57 wt % of the particles of the first mode of the bimodal particle size distribution of a total weight of the particles, no greater than about 53 wt % particles of the first mode of the bimodal particle size distribution for a total weight of the particles; or no greater than about 50 wt % particles of the first mode of the bimodal particle size distribution for a total weight of the particles.

Item 12. The solid oxide fuel cell stack of any one of the preceding items, wherein the bonding material comprises at least about 37 wt % particles of the second mode of the bimodal particle size distribution for a total weight of the particles, at least about 44 wt % of the particles of the second mode of the bimodal particle size distribution of a total weight of the particles, or at least about 47 wt % particles of the second mode of the bimodal particle size distribution for a total weight of the particles; or wherein the bonding material comprises no greater than about 59 wt % of the particles of the first mode of the bimodal particle size distribution for a total weight of the particles, no greater than about 55 wt % of the particles of the first mode of the bimodal particle size distribution of a total weight of the particles, or no greater than about 50 wt % particles of the first mode of the bimodal particle size distribution for a total weight of the particles.

Item 13. The solid oxide fuel cell stack of any one of the preceding items, wherein the bonding material includes a content of particles of the first mode of the bimodal particle size distribution that is substantially equal to a content of particles of the second mode of the bimodal particle size distribution.

Item 14. The solid oxide fuel cell stack of any one of the preceding items, in which the bonding layer comprises an ink in which the bonding material is contained within a carrier material.

Item 15. The solid oxide fuel cell stack of item 14, wherein the ink includes at least about 64 wt % LSM particles, at least about 69 wt % LSM particles of a total weight of the ink, at least about 73 wt % LSM particles of a total weight of the ink, or at least about 76 wt % LSM particles of a total weight of the ink; or wherein the ink includes no greater than about 88 wt % LSM particles of a total weight of the ink, no greater than about 83 wt % LSM particles of a total weight of the ink, or no greater than about 80 wt % LSM particles of a total weight of the ink.

Item 16. The solid oxide fuel cell stack of any one of items 14 to 15, wherein the ink includes LSM particles within a range of about 83 wt % of a total weight of the ink to about 77 wt % of a total weight of the ink.

Item 17. The solid oxide fuel cell stack of any one of items 14 to 16, wherein a viscosity of the ink is at least about 56 kilocentipoise (kcps), at least about 80 kcps, at least about 112 kcps, or at least about 131 kcps; or wherein the viscosity of the ink is no greater than about 196 kcps, no greater than about 175 kcps, no greater than about 160 kcps, or no greater than about 139 kcps.

Item 18. The solid oxide fuel cell stack of any one of items 14 to 17, wherein a viscosity of the ink is within a range of about 90 kcps to about 150 kcps.

Item 19. The solid oxide fuel cell stack of any one of the preceding items, the outer porous electrode layers of the first and second solid oxide fuel cells are cathode layers.

Item 20. The solid oxide fuel cell stack of any one of the preceding items, the outer porous electrode layers of the first and second solid oxide fuel cells are cathode layers comprising LSM and in which the bonding material comprises LSM.

Item 21. The solid oxide fuel cell stack of any one of items 1 to 18, in which the outer porous electrode layers of the first and second solid oxide fuel cells are anode layers comprising a cermet material and in which the bonding material comprises the same cermet material.

Item 22. The solid oxide fuel cell stack of any one of items 1 to 18, in which the outer porous electrode layers of the first and second solid oxide fuel cells are anode layers comprising Ni-YSZ and in which the bonding material comprises Ni-YSZ.

Item 23. The solid oxide fuel cell of item 1 in which the porous electrode layer of a first type is a cathode layer comprising lanthanum strontium manganite (LSM).

Item 24. The solid oxide fuel cell of item 23 in which the bonding layer includes at least about 80 wt % LSM particles, the LSM particles having a bimodal particle size distribution.

Item 25. The solid oxide fuel cell of item 1 in which the porous electrode layer of a first type is an anode layer comprising nickel and yttria-stabilized zirconia (Ni-YSZ).

Item 26. The solid oxide fuel cell of item 23 in which the bonding layer includes at least about 80 wt % Ni-YSZ particles, the Ni-YSZ particles having a bimodal particle size distribution.

Item 27. A bonding material of a solid oxide fuel cell stack for bonding together two electrode layers of the same type, the bonding material comprising an ink including:
at least about 80 wt % LSM particles of a total weight of the ink, the LSM particles being contained within a carrier material and the LSM particles having a bimodal particle size distribution; or
at least about 80 wt % Ni-YSZ particles of a total weight of the ink, the Ni-YSZ particles being contained within a carrier material and the Ni-YSZ particles having a bimodal particle size distribution.

Item 28. A method of bonding together two comprising solid oxide fuel cell units to form a solid oxide fuel cell stack, the method comprising:
loading a first solid oxide fuel cell unit and a second solid oxide fuel cell unit into a stencil printing apparatus, each fuel cell unit having at least one porous electrode layer of a first type on an outer surface of the fuel cell unit;
providing an ink to a stencil printing apparatus, the ink including particles having at least one material component in common with the composition of the porous electrode layer of a first type and the particles making up at least about 60 wt % of a total weight of the ink;
applying, by the stencil printing apparatus, the ink to the electrodes layer of a first type on the outer surfaces of the first and second solid oxide fuel cell units; and
bonding the electrode layer of a first type of the first solid oxide fuel cell unit to the electrode layer of a first type of the second solid oxide fuel cell unit to form a solid oxide fuel cell stack;
wherein the drying rate of the ink is controlled so that the ink has not dried when the electrode of the first solid oxide fuel cell unit is bonded to the electrode of the second solid oxide fuel cell unit.

Item 29. The method of item 28, further comprising:
placing a first MYLAR stencil on the electrode layer of a first type on an outer surface of the first solid oxide fuel cell unit before applying the ink to the electrode of the first solid oxide fuel cell unit; and
placing as second MYLAR stencil on the electrode layer of a first type on an outer surface of the second solid oxide fuel cell unit before applying the ink to the electrode of the second solid oxide fuel cell unit.

Item 30. The method of any one of items 28 or 29, further comprising mixing and de-airing the ink before applying the ink to the electrode of the first and second solid oxide fuel cell units.

Item 31. The method of any one of items 28 to 30 in which bonding the electrode layer of a first type of the first solid oxide fuel cell unit to the electrode layer of a first type of the second solid oxide fuel cell unit comprises bringing the printed sides of the fuel cell units together while the ink on each surface is still wet;
pressing the fuel cell units together at a pressure of about 1-2 psi for about 1-2 hours at room temperature to partially bond the fuel cell units;
heating the partially bonded fuel cell units within a range of approximately 1050° C. to approximately 1350° C. for two hours without any applied pressure; and
heating the fuel cell units within a range of approximately 1250° C. to approximately 1350° C. for about 1 to 3 hours at a pressure of at least about 0.1 MPa.

Item 32. The method of any one of items 28 to 31 in which only one layer of ink is applied.

Item 33. The method of item 32 in which the layer of ink is at least about 40 micrometers, at least about 81 micrometers, at least about 113 micrometers, at least about 148 micrometers, at least about 174 micrometers, or at least about 202 micrometers; or in which the thickness of the bonding layer is no greater than about 305 micrometers, no greater than about 279 micrometers, no greater than about 256 micrometers, or no greater than about 229 micrometers.

Item 34. The method of any one of items 28 to 30, further comprising applying a heat treatment to the solid oxide fuel cell stack.

Item 35. The method of item 34, wherein the heat treatment includes a pressureless sintering process.

Item 36. The method of item 35, wherein the pressureless sintering process includes heating the solid oxide fuel cell stack at a temperature within a range of approximately 1050° C. to approximately 1350° C.

Item 37. The method of any one of items 35 or 36, wherein the pressureless sintering process has a duration within a range of approximately 1 hour to approximately 3 hours.

Item 38. The method of item 34, wherein the heat treatment includes sintering the solid oxide fuel cell stack under an applied load.

Item 39. The method of item 38, wherein sintering the solid oxide fuel cell stack under an applied load comprises heating the solid oxide fuel cell stack at a temperature within a range of approximately 1250° C. to approximately 1350° C.

Item 40. The method of any one of items 38 or 39, wherein sintering the solid oxide fuel cell stack under an applied load has a duration within a range of approximately 1 hour to approximately 3 hours.

Item 41. The method of any one of items 38, 39, or 40, wherein sintering the solid oxide fuel cell stack under an applied load takes place at a pressure within a range of approximately 1 psi to approximately 500 psi, or approximately 100 psi to approximately 150 psi.

Item 42. The method of any one of items 28 to 41 in which the porous electrode layer of a first type is a cathode layer comprising LSM and in which the ink comprises LSM.

Item 43. The method of any one of items 28 to 41 in which the porous electrode layer of a first type is an anode comprising a cermet material and in which the ink comprises the same cermet material.

The present invention has broad applicability and can provide many benefits as described above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. For example, although much of the previous specification has described solid oxide fuel cells, embodiments of the present invention could also be used with other multi-layer porous ceramic devices such as solid oxide electrolyzers. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub-combination. Further, references to values stated in ranges include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Where a range of values is provided, it is understood that each intervening value, unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. When a value is described as "about" a specific value, the use of the term "about" will be understood to encompass the specific value itself and an appropriate range of values above and below the specific value.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A solid oxide fuel cell stack comprising:
   a first solid oxide fuel cell unit;
   a second solid oxide fuel cell unit; and
   a bonding layer coupled between an outer porous electrode layer of the first solid oxide fuel cell unit and an outer porous electrode layer of the second solid oxide fuel cell unit, the outer porous electrode layers of the first and second solid oxide fuel cell units having the same composition;
   wherein the bonding layer includes a bonding material comprising particles having at least one material component in common with the composition of the outer porous electrode layers of the first and second solid oxide fuel cell units and wherein the particles have a bimodal particle size distribution.

2. The solid oxide fuel cell stack of claim 1, wherein a thickness of the bonding layer is at least about 40 micrometers and no greater than about 305 micrometers.

3. The solid oxide fuel cell stack of claim 1, wherein the bonding material includes a porosity of at least about 33 vol % and no greater than about 51 vol % of a total volume of the bonding material.

4. The solid oxide fuel cell stack of claim 1, wherein particles of a first mode of the bimodal particle size distribution have a d50 of at least about 6.3 micrometers and no greater than about 10.3 micrometers.

5. The solid oxide fuel cell stack of claim 1, wherein particles of a second mode of the bimodal particle size distribution have a d50 of at least about 15.9 micrometers and no greater than about 50.8 micrometers.

6. The solid oxide fuel cell stack of claim 1, wherein the bonding material comprises at least about 38 wt % and no greater than about 61 wt % of the particles of a first mode of the bimodal particle size distribution for a total weight of the particles.

7. The solid oxide fuel cell stack of claim 1, wherein the bonding material comprises at least about 37 wt % and no greater than about 59 wt % of the particles of a second mode of the bimodal particle size distribution for a total weight of the particles.

8. The solid oxide fuel cell stack of claim 1, wherein the bonding material includes a content of particles of a first mode of the bimodal particle size distribution that is substantially equal to a content of particles of a second mode of the bimodal particle size distribution.

9. The solid oxide fuel cell stack of claim 1, wherein the bonding layer comprises an ink including the bonding material.

10. The solid oxide fuel cell stack of claim 9, wherein the ink includes at least about 64 wt % LSM particles and no greater than about 88 wt % LSM particles of a total weight of the ink.

11. The solid oxide fuel cell stack of claim 9, wherein a viscosity of the ink is at least about 56 kilocentipoise (kcps) and no greater than about 196 kcps.

12. The solid oxide fuel cell of claim 1, wherein the porous electrode layer of a first type is a cathode layer comprising lanthanum strontium manganite (LSM).

13. The solid oxide fuel cell of claim 12, wherein the bonding layer includes at least about 80 wt % LSM particles, the LSM particles having the bimodal particle size distribution.

14. The solid oxide fuel cell of claim 1, wherein the porous electrode layer of a first type is an anode layer comprising nickel and yttria-stabilized zirconia (Ni-YSZ).

15. The solid oxide fuel cell of claim 14, wherein the bonding layer includes at least about 80 wt % Ni-YSZ particles, the Ni-YSZ particles having the bimodal particle size distribution.

16. A solid oxide fuel cell stack, comprising:
at least two fuel cell units, each fuel cell unit comprising at least one porous electrode layer of a first type and at least one porous electrode layer of a second type separated by an electrolyte layer; and
a bonding layer coupled between the at least two fuel cell units and bonding an outer surface of the at least one porous electrode layer of the first type in one of the at least two fuel cell units to an outer surface of the at least one porous electrode layer of the first type in another one of the at least two fuel cell units;
wherein the bonding layer comprises particles contained within a carrier material, the particles having at least one material component in common with the at least one porous electrode layer of the first type and wherein the particles have a bimodal particle size distribution in which particles of a first mode of the bimodal particle size distribution are small enough to fit at least partially into a porosity of the at least one porous electrode layer of the first type and in which particles of a second mode of the bimodal particle size distribution are larger than the porosity of the at least one porous electrode layer of the first type.

17. A method of bonding together a plurality of solid oxide fuel cell units to form a solid oxide fuel cell stack, the method comprising:
loading a first solid oxide fuel cell unit and a second solid oxide fuel cell unit into a stencil printing apparatus, each fuel cell unit having at least one porous electrode layer of a first type on an outer surface of the fuel cell unit;
providing an ink to the stencil printing apparatus, the ink including particles having at least one material component in common with a composition of the at least one porous electrode layer of the first type and the particles making up at least about 60 wt % of a total weight of the ink and having a bimodal particle size distribution;
applying, by the stencil printing apparatus, the ink to the at least one electrode layer of the first type on the outer surfaces of the first and second solid oxide fuel cell units; and
bonding the at least one porous electrode layer of the first type of the first solid oxide fuel cell unit to the at least one porous electrode layer of the first type of the second solid oxide fuel cell unit to form the solid oxide fuel cell stack;
wherein a drying rate of the ink is controlled so that the ink has not dried when the at least one porous electrode layer of the first solid oxide fuel cell unit is bonded to the at least one porous electrode layer of the second solid oxide fuel cell unit.

18. The method of claim 17, wherein bonding the at least one porous electrode layer of the first type of the first solid oxide fuel cell unit to the at least one porous electrode layer of the first type of the second solid oxide fuel cell unit comprises:
bringing printed sides of the fuel cell units together while the ink on each surface is still wet;
pressing the fuel cell units together at a pressure of about 1-2 psi for about 1-2 hours at room temperature to partially bond the fuel cell units;
heating the partially bonded fuel cell units within a range of approximately 1050° C. to approximately 1350° C. for two hours without any applied pressure; and
heating the fuel cell units within a range of approximately 1250° C. to approximately 1350° C. for about 1 to 3 hours at a pressure of at least about 0.1 MPa.

19. The method of claim 17, further comprising mixing and de-airing the ink before applying the ink to the at least one porous electrode layers of the first and second solid oxide fuel cell units.

20. The method of claim 17, further comprising:
placing a first stencil on the at least one porous electrode layer of the first type on the outer surface of the first solid oxide fuel cell unit before applying the ink to the at least one porous electrode layer of the first solid oxide fuel cell unit; and
placing a second stencil on the at least one porous electrode layer of the first type on the outer surface of the second solid oxide fuel cell unit before applying the ink to the at least one porous electrode layer of the second solid oxide fuel cell unit.

* * * * *